United States Patent
Cho

(10) Patent No.: US 8,831,665 B2
(45) Date of Patent: Sep. 9, 2014

(54) METHOD AND SYSTEM FOR CONTROLLING POWER IN PORTABLE INTERNET SYSTEM

(75) Inventor: Woung-Sik Cho, Seocho-gu (KR)

(73) Assignee: SK Telecom Co., Ltd., Seoul (KR)

( * ) Notice: Subject to any disclaimer, the term of this patent is extended or adjusted under 35 U.S.C. 154(b) by 1580 days.

(21) Appl. No.: 11/229,204

(22) Filed: Sep. 15, 2005

(65) Prior Publication Data

US 2007/0060188 A1    Mar. 15, 2007

(51) Int. Cl.
*H04B 7/00* (2006.01)
*H04W 52/20* (2009.01)
*H04W 52/26* (2009.01)

(52) U.S. Cl.
CPC ............ *H04W 52/20* (2013.01); *H04W 52/262* (2013.01)
USPC ........................................................ 455/522

(58) Field of Classification Search
USPC ........................................................ 455/522
See application file for complete search history.

(56) References Cited

U.S. PATENT DOCUMENTS

| | | | |
|---|---|---|---|
| 7,289,574 B2 * | 10/2007 | Parolari ........................ | 375/295 |
| 2002/0012383 A1 | 1/2002 | Higuchi et al. .......... | H04K 1/00 |
| 2002/0042290 A1 * | 4/2002 | Williams et al. ............... | 455/562 |
| 2002/0094832 A1 * | 7/2002 | Lee ................................ | 455/522 |
| 2002/0136357 A1 * | 9/2002 | Suonsivu et al. ............ | 379/1.04 |
| 2003/0231706 A1 | 12/2003 | Hwang .................... | H04B 1/38 |
| 2006/0223445 A1 * | 10/2006 | Baker et al. ...................... | 455/69 |
| 2006/0258359 A1 * | 11/2006 | Dei ................................. | 455/441 |
| 2007/0026803 A1 * | 2/2007 | Malm ........................... | 455/63.1 |

FOREIGN PATENT DOCUMENTS

| | | |
|---|---|---|
| CN | 1332543 | 1/2002 |
| CN | 1469662 | 1/2004 |
| KR | 2003-0084154 | 11/2003 |

OTHER PUBLICATIONS

Foreign Office action for Korean patent app. 10-2004-0045510.
Office Action dated Jun. 5, 2009, for Chinese application No. 2005101084236.

* cited by examiner

*Primary Examiner* — Ankur Jain
(74) *Attorney, Agent, or Firm* — Lowe Hauptman & Ham, LLP

(57) ABSTRACT

Disclosed is a power control method in a portable Internet system for controlling data transmission output on a mobile communication system by using an AMC table in a mobile communication network employing an AMC scheme, the AMC table including modulation levels of data transmitted on the mobile communication system and request power information according to the modulation levels. The power control method includes the steps of: (a) setting maximum request power of request power corresponding to the modulation levels allocated to the mobile communication system as data transmission output on the mobile communication system by means of the AMC scheme; (b) comparing a BER occurring in the data transmission with a preset critical BER; (c) decreasing the data transmission output by a predetermined interval when the BER is smaller than the preset critical BER; (d) increasing the data transmission output by a predetermined interval when the BER is larger than the preset critical BER; and (e) maintaining the data transmission output at a current state when the BER is equal to the preset critical BER.

10 Claims, 4 Drawing Sheets

| Modulation Scheme | Channel Coding Rate | CINR(db) | | | | | |
|---|---|---|---|---|---|---|---|
| | | Ped-A 3KM/h | Ped-A 10KM/h | Ped-B 3KM/h | Ped-B 10KM/h | Veh-A 60KM/h | |
| QPSK | 1/12 | -3.95(-3.35) | -3.8(-3.65) | -3.9 | -3.9 | -3.9 | |
| QPSK | 1/6 | -1.65(-1.65) | -1.4(-1.65) | -1.5 | -1.45 | -1.45 | |
| QPSK | 1/3 | 1.5(0.5) | 2.1(0.6) | 1.6 | 1.65 | 1.65 | |
| QPSK | 1/2 | 4.3(2.5) | 5.3(2.45) | 4.25 | 4.3 | 4.4 | |
| QPSK | 2/3 | 7.95(4.5) | 9.4(4.6) | 7.9 | 8 | 8.15 | |
| 16QAM | 1/2 | 9.3(7.35) | 10.15(7.55) | 9.25 | 9.35 | 9.5 | |
| 16QAM | 2/3 | 13.1(10.2) | 14.6(10.4) | 13.2 | 13.5 | 13.65 | |
| 16QAM | 3/4 | 15.8(11.5) | 17.7(11.85) | 16.7 | 16.5 | 15.7 | |
| 64QAM | 2/3 | 18.45(15.05) | 19.7(15.6) | 18.2 | 18.4 | 19.2 | |
| 64QAM | 5/6 | 24.8(18.9) | 27.2(22) | 24.4 | 24.7 | 27.5 | |

FIG.2

METHOD AND SYSTEM FOR CONTROLLING POWER IN PORTABLE INTERNET SYSTEM

BACKGROUND OF THE INVENTION

1. Field of the Invention

The present invention relates to a method and a system for controlling power in a portable Internet system, and more particularly to a method and a system for controlling power in a portable Internet system, capable of controlling data transmission output on a mobile communication system by employing an Adaptive Modulation and Coding (Hereinafter, referred to as AMC) scheme using an AMC table including modulation levels of data transmitted on the mobile communication system and request power information according to the modulation levels, together with a power control scheme for additionally applying Bit Error Rate (Hereinafter, referred to as BER) information to the AMC scheme, in a mobile communication network employing the AMC scheme.

2. Description of the Prior Art

With the rapid development of computer, electronic and communication technology, various wireless communication services using a wireless network have been provided. The most basic wireless communication service is a wireless voice communication service for providing voice communication to mobile communication terminal users wirelessly, which has a characteristic of providing the service to the users regardless of time and place. Further, the wireless communication service supplements a voice communication service by providing a text message service. Recently, a wireless Internet service has emerged, which provides an Internet communication service to mobile communication terminal users through a wireless network.

With the development of communication technology as described above, a service provided by a wideband Code Division Multiple Access (Hereinafter, referred to as CDMA) mobile communication system is being developed to a multimedia communication service for the transmission of data such as circuit and packet data, including a conventional voice service.

With the recent development of information communication, an International Mobile Telecommunication (Hereinafter, referred to as IMT)-2000, e.g., a CDMA 2000 1X, 3X, EV-DO and a Wideband CDMA (WCDMA), has been commercialized, which is the $3^{rd}$ mobile communication system and has been established as a standard by an International Telecommunication Union Recommendation (ITU-R). An IMT-2000 is a service capable of providing a wireless Internet service at a maximum transmission speed of 144 Kbps far faster than 14.4 Kbps or 56 Kbps, which is the data transmission speed supported by an Interim Standard (Hereinafter, referred to as IS)-95A network or an IS-95B network, by means of an IS-95C network evolved from the existing IS-95A network and IS-95B network. In particular, an IMT-2000 service is used, so that the quality of an existing voice and Wireless Application Protocol (WAP) service can be improved and various multimedia services, e.g., Audio On Demand (AOD), Video On Demand (VOD), etc., can be provided at higher speed.

However, because the existing mobile communication system has high base station installation cost, service charges for the wireless Internet are high. Further, because a mobile communication terminal has a small screen, available content is restricted. Therefore, there is a limitation in providing an ultra high-speed wireless Internet service. Furthermore, because Wireless Local Area Network (WLAN) technology shows radio wave interference, narrow service coverage, etc, there is a limitation in providing a public service. Accordingly, a High-speed Portable Internet (Hereinafter, referred to as HPi) system has emerged, which can guarantee portability and mobility and an ultra high-speed wireless Internet service at low cost.

An HPi system uses a 2.3 GHz frequency band, uses a Time Division Duplex (Hereinafter, referred to as TDD) scheme as a duplex scheme, and uses an Orthogonal Frequency Division Multiple Access (Hereinafter, referred to as OFDMA) scheme as an access scheme. Further, an HPi system provides mobility of 60 km/h, which is an Internet Protocol (IP)-based wireless data system having an upload/download asymmetric transmission characteristic in which a download transmission speed is 24.8 Mbps and an upload transmission speed is 5.2 Mbps.

A mobile communication system such as an HPi system has used power control technology in order to use radio resources more efficiently. In particular, the $2^{nd}$ or $3^{rd}$ mobile communication system has used high-speed power control technology. This power control technology is technology for controlling transmit power of each mobile communication terminal or transmit power of a base station in order to allow all mobile communication terminals to equally receive services from the same base station. That is, the technology causes a mobile communication terminal having bad channel conditions to consume more transmit power than a mobile communication terminal having relatively good channel conditions, so that transmit signals from all mobile communication terminals can be received in a base station at a constant power level. A base station determines a power value of transmit signals in consideration of channel conditions of each mobile communication terminal, so that all mobile communication terminals can receive signals at a constant power value.

It is usual that a mobile communication system mainly for voice communication employs such power control technology as described above. This is because transfer of better signals beyond the minimum signal intensity necessary for transfer of human voice which does not require a large amount of data is meaningless and may cause excessive battery power consumption which reduce the lifespan of the battery. Further, excessively high signals from one user may cause the resources which can be used by other users to be wasted. Accordingly, the power control technology is used, so that radio wave resources can be preserved. Consequently, services of equal quality are provided to users located in places having unfavorable radio wave conditions and users located in places having favorable radio wave conditions.

A mobile communication system for high-speed packet transmission has used AMC technology in order to allocate radio resources efficiently, in contrast with the $2^{nd}$ mobile communication system using a fixed coding rate and modulation scheme. Herein, the AMC technology changes the coding rate and the modulation scheme of a mobile communication terminal according to changes in downlink conditions. For this, each mobile communication terminal periodically inspects the downlink conditions and notifies a base station of the inspection result as Channel Quality Information (Hereinafter, referred to as CQI). The base station predicts the downlink conditions for a corresponding mobile communication terminal through the CQI, and designates a proper coding rate and modulation scheme to the corresponding mobile communication terminal based on the predicted downlink conditions. This designation of the coding rate and the modulation scheme is typically performed by an MCS level determined by the CQI. High-speed packet transmission has been proposed as a High Speed Downlink Packet Access (HSDPA) and a 1X-EVDV. A modulation scheme discussed for an AMC in the HSDPA and the 1X-EVDV includes a Quadrature Phase Shift Keying (Hereinafter, referred to as QPSK), a 8PSK, a 16 Quadrature Amplitude Modulation (Hereinafter, referred to as QAM), a 64 QAM, etc., and 1/2, 3/4, . . . , 5/6, etc., are considered as a channel coding rate. Accordingly, a system employing the AMC applies a high order modulation scheme (16 QAM or 64 QAM) and a high coding rate (3/4) to mobile communication terminals using channels of high quality as well as mobile communication terminals near a base station. However, the system typically applies a low order modulation scheme (8 PSK or QPSK) and a low coding rate (1/2) to mobile communication terminals using channels of low quality as well as mobile communication terminals located in a boundary of a cell.

However, both channel conditions and various factors exist in selecting the modulation scheme and the coding rate as described above. That is, even though terminals having the same channel conditions, different modulation schemes and coding rates must be applied to the terminals according to radio wave reflection conditions of surrounding topography, the movement speed of the terminals, changes in inter-cell interference, etc. Further, there is a problem in that a terminal or a base station cannot recognize radio wave conditions of its own channel conditions. Accordingly, a system designer must apply an AMC scheme assuming the worst of these situations. However, this system design may cause a terminal or a base station to output excessive signals in an area having favorable radio wave conditions, thereby increasing interference between system elements. Therefore, the total system capability may deteriorate.

SUMMARY OF THE INVENTION

Accordingly, the present invention has been made to solve the above-mentioned problems occurring in the prior art, and an object of the present invention is to provide a method and a system for controlling power in a portable Internet system, which can control data transmission output on a mobile communication system by employing an Adaptive Modulation and Coding (Hereinafter, referred to as AMC) scheme using an AMC table including modulation levels of data transmitted on the mobile communication system and request power information according to the modulation levels, together with a power control scheme for additionally applying Bit Error Rate (Hereinafter, referred to as BER) information to the AMC scheme, in a mobile communication network employing the AMC scheme.

In order to accomplish this object, there is provided a power control method in a portable Internet system for controlling data transmission output on a mobile communication system by using an Adaptive Modulation and Coding (AMC) table in a mobile communication network employing an AMC scheme, the AMC table including modulation levels of data transmitted on the mobile communication system and request power information according to the modulation levels, the power control method including the steps of: (a) setting maximum request power of request power corresponding to the modulation levels allocated to the mobile communication system as data transmission output on the mobile communication system by means of the AMC scheme; (b) comparing a Bit Error Rate (BER) occurring in the data transmission with a preset critical BER; (c) decreasing the data transmission output by a predetermined interval when the BER is smaller than the preset critical BER; (d) increasing the data transmission output by a predetermined interval when the BER is larger than the preset critical BER; and (e) maintaining the data transmission output at a current state when the BER is equal to the preset critical BER.

In order to accomplish this object, there is provided a power control system in a portable Internet system for controlling data transmission output on a mobile communication system by using an Adaptive Modulation and Coding (AMC) table in a mobile communication network employing an AMC scheme, the AMC table including modulation levels of data transmitted on the mobile communication system and request power information according to the modulation levels, the power control system including: an AMC initialization unit for setting maximum request power of request power corresponding to the modulation levels allocated to the mobile communication system as data transmission output on the mobile communication system by means of the AMC scheme; a comparison unit for comparing a Bit Error Rate (BER) occurring in the data transmission with a preset critical BER; and an output control unit for decreasing the data transmission output by a predetermined interval when the BER is smaller than the preset critical BER, increasing the data transmission output by a predetermined interval when the BER is larger than the preset critical BER, and maintaining the data transmission output at a current state when the BER is equal to the preset critical BER.

BRIEF DESCRIPTION OF THE DRAWINGS

The above and other objects, features and advantages of the present invention will be more apparent from the following detailed description taken in conjunction with the accompanying drawings, in which:

FIG. 2 is one example of an AMC table used in a portable Internet system according to a preferred embodiment of the present invention;

DETAILED DESCRIPTION OF THE PREFERRED EMBODIMENTS

Figure 1:
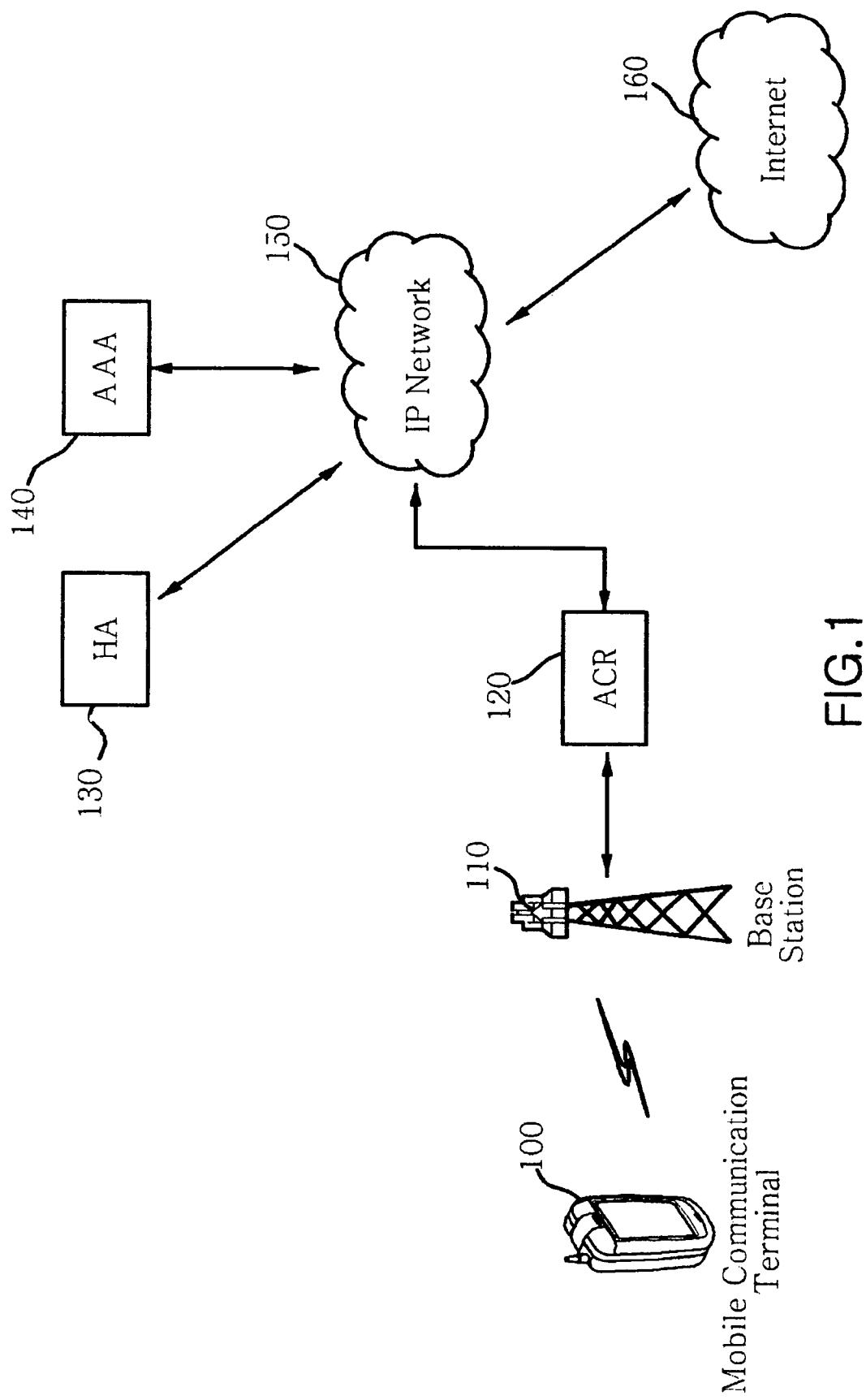
FIG. 1 is a block diagram schematically illustrating the construction of an HPi system according to a preferred embodiment of the present invention.

Hereinafter, a preferred embodiment of the present invention will be described with reference to the accompanying drawings. In adding reference numerals to components of each drawing, the same reference numerals are used to designate the same or similar components, and so repetition of the description on the same or similar components will be omitted. In the following description of the present invention, a detailed description of known functions and configuration incorporated herein will be omitted when it may make the subject matter of the present invention unclear.

FIG. 1 is a block diagram schematically illustrating the construction of a High-speed Portable Internet (Hereinafter, referred to as HPi) system according to a preferred embodiment of the present invention.

As illustrated in FIG. 1, the HPi system may include a mobile communication terminal 100, Base Stations (BSs) 110 which are Access Points (APs), an Access Control Router (Hereinafter, referred to as ACR) 120 for controlling plural base stations 110, a Home Agent (Hereinafter, referred to as HA) 130, an Authentication, Authorization, Accounting (Hereinafter, referred to as AAA) 140, an Internet Protocol (Hereinafter, referred to as IP) network 150, the Internet 160, etc.

The mobile communication terminal 100 according to the preferred embodiment of the present invention denotes a mobile communication terminal for connecting to the HPi system and using an ultra high-speed wireless Internet service. Further, the mobile communication terminal 100 performs a low power Radio Frequency (RF)/Intermediate Frequency (IF) module and controller function, a Media Access Control (Hereinafter, referred to as MAC) frame variable control function according to service characteristics and radio wave conditions, a handoff function, an authentication function, an encryption function, etc.

The base station 110 according to the preferred embodiment of the present invention is an AP of the HPi system, which transmits data received from the ACR 120 to the mobile communication terminal 100 by wireless, and performs a low power RF/IF module and controller function, an OFDMA/TDD packet scheduling and channel multiplexing function, an MAC frame variable control function according to service characteristics and radio wave conditions, a 50 Mbps high-speed traffic realtime control function, a handoff function, etc.

The mobile communication terminal 100 and the base station 110 according to the preferred embodiment of the present invention performs a 50 Mbps packet transmission modulation/demodulation function, a high-speed packet channel coding function, a realtime modem control function, etc., for data transmission.

The ACR 120 according to the preferred embodiment of the present invention is an ACR for controlling the base stations 110, which performs a handoff control function between the base stations 110, a handoff function between the ACRs 120, a packet routing function, an Internet access function, etc., and connects to the IP network 150.

The HA 130 according to the preferred embodiment of the present invention performs routing for transmitting packets from an external packet data service server such as the Internet 160. Further, the AAA 140 performs accounting for packet data used by the mobile communication terminal 100 by inter-working with the base station 110, and authenticates an access from the mobile communication terminal 100.

The IP network 150 according to the preferred embodiment of the present invention supports connection among the base station 110, the ACR 120, the HA 130, the AAA 140, etc., receives packet data from the external packet data service server such as the Internet 160, and transmits the received packet data to the base station 110.

FIG. 2 is one example of an Adaptive Modulation and Coding (Hereinafter, referred to as AMC) table used in the portable Internet system according to the preferred embodiment of the present invention.

FIG. 2 shows the power required for modulation levels according to channel conditions of a mobile communication system. The table of FIG. 2 is an exemplary one and may be determined according to the channel conditions of the mobile communication system. The channel conditions may include radio wave reflection conditions of surrounding topography, the movement speed of the terminal, changes in inter-cell interference, etc. Accordingly, the channel conditions may exist numerously. The table of FIG. 2 is only a table including five representative channel conditions.

Referring to the table of FIG. 2, it can be understood that the modulation level means a modulation scheme and a channel coding rate. The modulation scheme includes a Quadrature Phase Shift Keying (Hereinafter, referred to as QPSK), a 16 Quadrature Amplitude Modulation (Hereinafter, referred to as QAM), a 64 QAM, etc.

Referring to the table of FIG. 2, it can be understood that there is big difference between powers required by the Ped-A (3 km/h) condition and the Ped-B (10 km/h) condition in the same modulation level. It is noted from a detailed view that the worst conditions are different in each modulation level. Accordingly, in a system employing this AMC scheme, a designer employs a value requiring the maximum power in each modulation level as the request power of the system. This is because a base station and a terminal cannot recognize channel conditions of positions in which the base station and the terminal are located. For example, a system must be designed to satisfy the power of 27.5 in a modulation level of 64 QAM 5/6 rate. However, in this case, if an actual radio wave condition is the Ped-A (3 km/h) condition, the excessive signal level loss of about 2.7 dB may occur. Further, because a stationary terminal (not shown in the table) requires power of about 20 dB, it can be understood that the signal level loss may increase. Accordingly, the present invention proposes the following scheme in order to reduce this signal level loss while using the existing AMC table.

Figure 3:
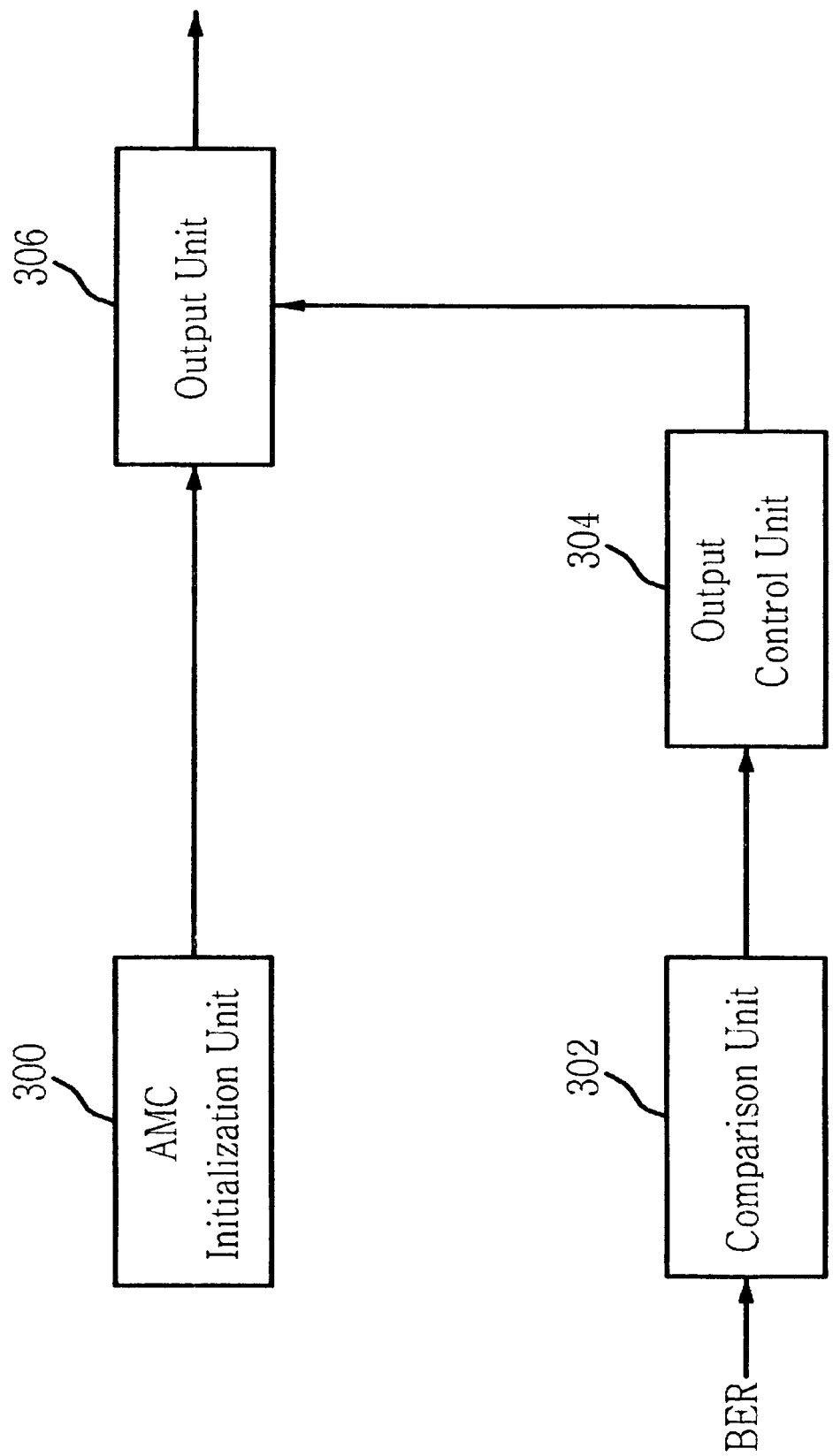
FIG. 3 is a block diagram schematically illustrating the construction of a power control system in a portable Internet system according to a preferred embodiment of the present invention.

FIG. 3 is a block diagram schematically illustrating the construction of a power control system in the portable Internet system according to a preferred embodiment of the present invention.

As illustrated in FIG. 3, the power control system in the portable Internet system according to the preferred embodiment of the present invention may include an AMC initialization unit 300, a comparison unit 302, an output control unit 304, an output unit 306, etc.

The AMC initialization unit 300 according to the preferred embodiment of the present invention sets the maximum request power of request power corresponding to modulation levels allocated to the mobile communication system as data transmission output on the mobile communication system by means of the afore-described AMC scheme. For example, the AMC initialization unit 300 sets the maximum request power 17.7 to be initially outputted in a modulation level of 16 QAM 3/4 rate. Herein, the mobile communication system is a system using a mobile communication network including an HPi, which may be a mobile communication terminal, a base station, etc.

The comparison unit 302 according to the preferred embodiment of the present invention compares a Bit Error Rate (BER) occurring in data transmission on the mobile communication system with a preset critical BER. This comparison is performed only after a proper link is formed between a base station and a mobile communication terminal on the mobile communication system and it is confirmed whether data transmission has started.

The output control unit 304 according to the preferred embodiment of the present invention decreases data transmission output by a predetermined interval when the BER of data transmitted/received on the mobile communication system is smaller than the preset critical BER as a result of the comparison by the comparison unit 302. When the BER of the data transmitted/received on the mobile communication system is larger than the preset critical BER as the result of the comparison by the comparison unit 302, the output control unit 304 increases the data transmission output by a predetermined interval. Further, when the BER of the data transmitted/received on the mobile communication system is equal to the preset critical BER as the result of the comparison by the comparison unit 302, the output control unit 304 controls the data transmission output to maintain the current state. Herein, the predetermined interval for the decrease when the BER of the data is smaller than the preset critical BER is preferably 0.1 dB. However, the predetermined interval for the increase when the BER of the data is larger than the preset critical BER is preferably 0.2 dB. However, the scope of the present invention is not limited to these intervals.

The output unit 306 according to the preferred embodiment of the present invention performs a function of outputting initial output signals having been initially set in the AMC initialization unit 300 and output signals controlled by the output control unit 304 from the mobile communication system.

Figure 4:
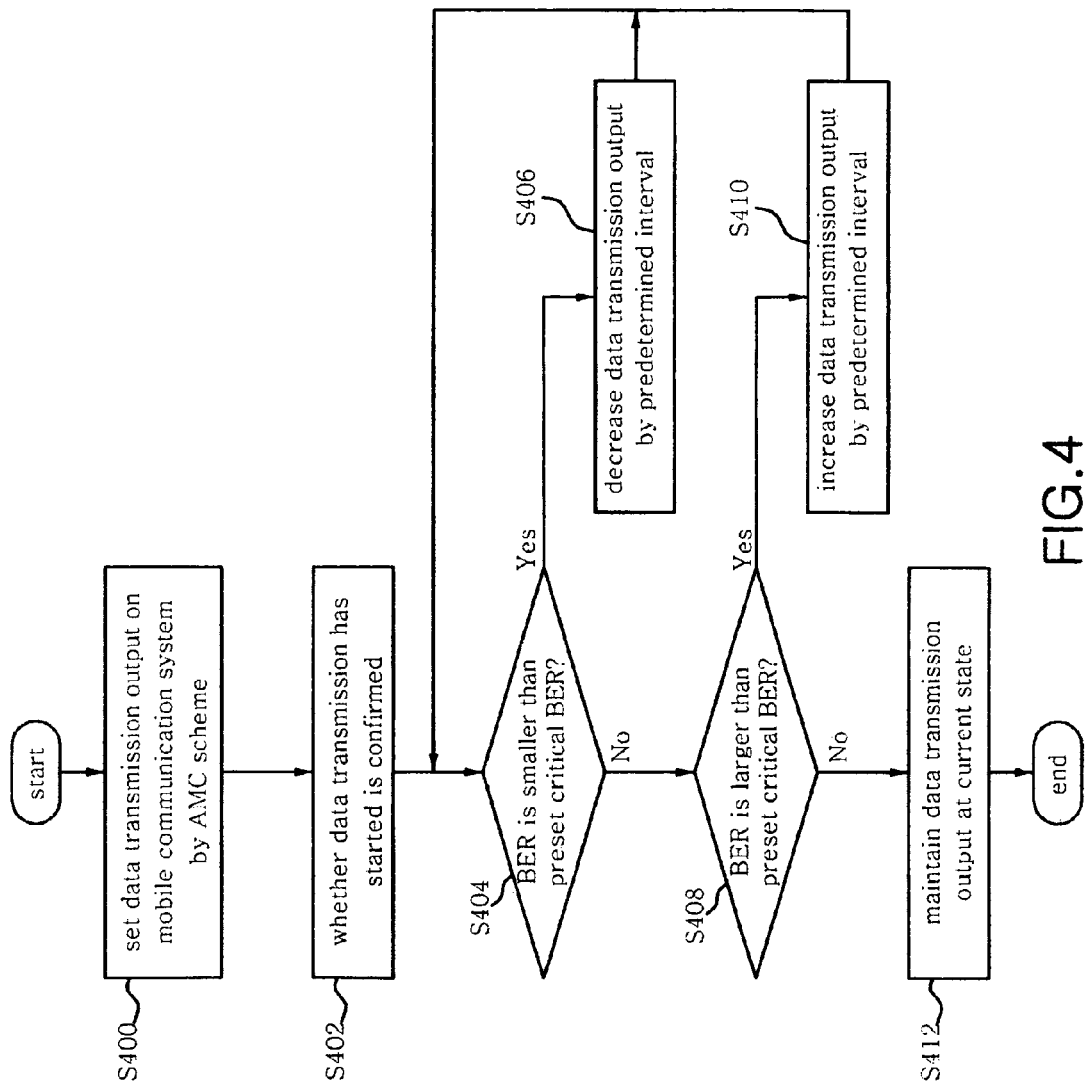
FIG. 4 is a flow diagram illustrating a power control process in a portable Internet system according to a preferred embodiment of the present invention.

FIG. 4 is a flow diagram illustrating a power control process in the portable Internet system according to a preferred embodiment of the present invention.

First, the AMC initialization unit 300 according to the preferred embodiment of the present invention sets the maximum request power of request power corresponding to modulation levels allocated to the mobile communication system as data transmission output on the mobile communication system by means of the AMC scheme (S400). Next, whether data transmission has started in the mobile communication system is confirmed (S402). When it is confirmed that the data transmission has started, the comparison unit 302 compares the BER occurring in the data transmission with the preset critical BER (S404 and 408).

When the BER occurring in the data transmission on the mobile communication system is smaller than the preset critical BER, the output control unit 304 decreases the data transmission output by a predetermined interval (S406). When the BER occurring in the data transmission on the mobile communication system is larger than the preset critical BER, the output control unit 304 increases the data transmission output by a predetermined interval (S410). The output control unit 304 repeats this operation until the BER occurring in the data transmission on the mobile communication system becomes equal to the preset critical BER. Then, the output control unit 304 maintains the data transmission output when the BER is equal to the preset critical BER (S412).

Accordingly to the present invention as described above, a system employing an existing AMC scheme additionally uses a power control scheme utilizing channel conditions including a BER, etc., thereby increasing the total capacity of the mobile communication system and improving the quality of a mobile communication service.

Although a preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A power control method for controlling data transmission power of a mobile communication terminal or a base station by using an Adaptive Modulation and Coding (AMC) table in a mobile communication network employing an AMC scheme, the AMC table defining a plurality of modulation levels for data transmission, the power control method comprising the sequential steps of:

(a) adaptively allocating a modulation level according to the AMC scheme based on changes in downlink conditions for the mobile communication terminal, and initializing the data transmission power, wherein the AMC table defines a plurality of power requests defined according to at least a movement speed of the mobile communication terminal for each of the plurality of the modulation levels, and the data transmission power is determined as a power corresponding to a maximum value from among the plurality of power requests associated with the allocated modulation level;

(b) confirming start of data transmission and comparing a Bit Error Rate (BER) occurring in the data transmission with a preset critical BER;

(c) at the allocated modulation level, decreasing the data transmission power by a predetermined value when the BER is smaller than the preset critical BER to reduce excessive transmission power;

(d) at the allocated modulation level, increasing the data transmission power by a predetermined value when the BER is larger than the preset critical BER; and (e) at the allocated modulation level, maintaining the data transmission power at a current state when the BER is equal to the preset critical BER.

2. The power control method as claimed in claim 1, wherein the modulation level of the AMC table includes a modulation scheme and a channel coding rate.

3. The power control method as claimed in claim 2, wherein the modulation scheme includes at least one of a Quadrature Phase Shift Keying (QPSK), a 16 Quadrature Amplitude Modulation (QAM) and a 64 QAM.

4. The power control method as claimed in claim 1, wherein power values for each of the modulation levels in the AMC table are further defined according to at least one of radio wave reflection conditions of surrounding topography of a mobile communication system and changes in inter-cell interference.

5. A power control system configured to control data transmission power of a mobile communication terminal or a base station by using an Adaptive Modulation and Coding (AMC) table in a mobile communication network employing an AMC scheme, the AMC table defining a plurality of modulation levels for data transmission, the power control system comprising:

an AMC initialization unit configured to initialize the data transmission power, wherein the AMC table defines a plurality of power requests defined according to at least a movement speed of the mobile communication terminal for each of the plurality of modulation levels, and the data transmission power is determined as a power corresponding to a maximum value from among the plurality of power requests associated with a modulation level adaptively allocated to a mobile communication system by the AMC scheme based on changes in downlink conditions for the mobile communication terminal;

a comparison unit configured to compare a Bit Error Rate (BER) occurring in the data transmission with a preset critical BER after confirmation of a start of the data transmission; and an output control unit configured to decrease or increase the data transmission power by a predetermined value based on an output of the comparison so as to meet the preset critical BER to reduce excessive transmission power for the adaptively allocated modulation level in an actual channel condition; and wherein the allocated modulation level is maintained in a current channel condition and is adaptively changed by the AMC scheme when there is a change in the current channel condition.

6. The power control system as claimed in claim 5, wherein the modulation level of the AMC table includes a modulation scheme and a channel coding rate.

7. The power control system as claimed in claim 6, wherein the modulation scheme includes at least one of a Quadrature Phase Shift Keying (QPSK), a 16 Quadrature Amplitude Modulation (QAM) and a 64 QAM.

8. The power control system as claimed in claim 5, wherein power values for each of the modulation levels in the AMC table are further defined according to at least one of radio wave reflection conditions of surrounding topography of the mobile communication system, and changes in inter-cell interference.

9. A method for controlling data transmission power in a mobile communication system by using an Adaptive Modulation and Coding (AMC) scheme, where plurality of modulation levels and a plurality of power values for each of the modulation levels are defined, the power control method comprising the steps of:

(a) initializing the data transmission power, wherein an AMC table defines a plurality of power requests defined according to at least a movement speed of a mobile communication terminal for each of the plurality of the modulation levels, the data transmission power is determined as a power corresponding to a maximum value from among the plurality of power requests associated with an allocated modulation level, and the allocated modulation level is adaptively allocated by the AMC scheme based on changes in downlink conditions for the mobile communication terminal;

(b) confirming a start of data transmission and comparing a Bit Error Rate (BER) occurring in the data transmission with a preset critical BER;

(c) at the allocated modulation level, decreasing the data transmission power by a predetermined value when the BER is smaller than the preset critical BER to reduce excessive transmission power for the adaptively allocated modulation level in an actual channel condition; and (d) at the allocated modulation level, increasing the data transmission power by a predetermined value when the BER is larger than the preset critical BER; and wherein the allocated modulation level is maintained in a current channel condition and is adaptively changed by the AMC scheme when there is a change in the current channel condition.

10. The power control method as claimed in claim 9, wherein the modulation levels includes a modulation scheme and a channel coding rate.

\* \* \* \* \*